United States Patent [19]

Vassilakis et al.

[11] Patent Number: 5,207,892

[45] Date of Patent: May 4, 1993

[54] HYDROCARBON CONVERSION PROCESS EMPLOYING A MODIFIED FORM OF ZEOLITE Y

[75] Inventors: James G. Vassilakis, New York; Donald F. Best, Mahopac, both of N.Y.

[73] Assignee: UOP, Des Plaines, Ill.

[21] Appl. No.: 633,544

[22] Filed: Dec. 24, 1990

Related U.S. Application Data

[63] Continuation-in-part of Ser. No. 417,611, Oct. 5, 1989, Pat. No. 5,013,699, which is a continuation-in-part of Ser. No. 178,901, Apr. 7, 1988, abandoned.

[51] Int. Cl.$^5$ .......................................... C10G 47/02
[52] U.S. Cl. ................................. 208/111; 208/134; 208/135; 208/137; 208/138; 208/213; 208/254 H; 585/467; 585/481; 585/482; 585/739
[58] Field of Search ............... 208/111, 136, 137, 135; 585/468, 467, 481, 73

[56] References Cited

U.S. PATENT DOCUMENTS

| | | | |
|---|---|---|---|
| 3,312,615 | 4/1957 | Cramer et al. | 208/136 |
| 4,517,073 | 5/1985 | Ward et al. | 208/111 |
| 4,517,074 | 5/1985 | Ward | 208/111 |
| 4,661,239 | 4/1987 | Steigleder | 208/111 |
| 4,689,137 | 8/1987 | Clark | 208/111 |
| 4,826,587 | 5/1989 | Ward et al. | 208/111 |
| 4,857,169 | 8/1989 | Abob | 208/111 |
| 4,857,170 | 8/1989 | Hoek et al. | 208/111 |
| 4,857,171 | 8/1989 | Hoek et al. | 208/111 |
| 4,871,142 | 10/1989 | Koepke et al. | 208/111 |
| 4,894,142 | 1/1990 | Steigleder | 208/111 |
| 4,897,178 | 1/1990 | Best et al. | 208/111 |
| 4,923,592 | 5/1990 | Abdo | 208/111 |
| 5,013,699 | 5/1991 | Vassilakis et al. | 502/73 |
| 5,037,531 | 8/1991 | Bundens et al. | 208/111 |

*Primary Examiner*—Helane Myers
*Attorney, Agent, or Firm*—Thomas K. McBride; Richard G. Miller

[57] ABSTRACT

Novel catalyst compositions comprising a metal hydrogenation component and a modified form of zeolite Y are found to be highly effective in the hydrocarbon conversion processes carried out in the presence of added hydrogen and involving hydrogenation as an essential reaction mechanism. The modified form of zeolite Y is prepared from a starting zeolite Y which has been ammonium cation exchanged to lower the alkali metal content to less than 3.0 weight percent. The starting composition is then steamed at temperatures above about 550° C. to reduce the unit cell dimension and then contacted with an aqueous ammonium ion solution having a pH below about 4 to increase the bulk Si-/Al$_2$ ratio to the range of about 6.5 to 20.

8 Claims, No Drawings

HYDROCARBON CONVERSION PROCESS EMPLOYING A MODIFIED FORM OF ZEOLITE Y

RELATED APPLICATIONS

This application is a continuation-in-part of copending application Ser. No. 417,611, filed Oct. 5, 1989 now U.S. Pat. No. 5,013,699, which is in turn a continuation-in-part of application Ser. No. 178,901, filed Apr. 7, 1988, and now abandoned.

FIELD OF THE INVENTION

The present invention relates to novel catalyst compositions and to hydrocarbon processes utilizing such catalysts. More particularly, it relates to catalyst compositions comprising a metal hydrogenation component and a modified form of zeolite Y prepared from a starting zeolite Y which has been ammonium cation exchanged to reduce its $Na_2O$ content to less than about 3.0 and then subjected first to steaming to reduce its unit cell dimension, preferably to less than 24.60 Angstroms, and thereafter to extraction and further ion-exchange with an aqueous ammonium salt solution having a pH of less than 4.0. By virtue of this modification treatment, the zeolite Y catalyst base has a bulk $Si/Al_2$ ratio of from 6.5 to 20 and a framework $Si/Al_2$ ratio of substantially the same value. The invention also relates to the use of such catalysts in hydrocarbon conversion reactions in which hydrogenation is an essential aspect.

BACKGROUND OF THE INVENTION

Several of the hydrocarbon conversion processes used in the refining of petroleum-derived feedstocks involve hydroprocessing, i.e., involve hydrogenation as an essential reaction. Such hydroconversion processes include hydrocracking, reforming, hydrotreating, hydrodealkylation, isomerization and hydroisomerization as well as hydrogenation per se. Except in the case where hydrogenation is essentially the only reaction involved, the hydrogenation catalyst or promoter is combined with another catalyst component which creates the intermediate conversion products which are to be hydrogenated. The components of the overall catalyst composition are thus interrelated in their performance and the net results of the conversion processes dependent upon the peculiar catalytic properties of each component.

In our copending application Ser. No. 417,611, filed Oct. 5, 1989, (incorporated by reference herein in its entirety) there is described and claimed a novel zeolitic catalyst material which, due to its unique activity, selectivity and stability, is found to be highly effective as the acidic constituent of dual function hydrocarbon conversion catalyst compositions. Because of the method by which it is produced, this zeolite catalyst can exhibit various degrees of acidity and thus be readily adapted to convert the desired fraction of hydrocarbon feedstock to lower boiling products. At the same time, its selectivity for the degree of fragmentation of feedstock molecules can be adapted to meet the different requirements of, for instance, mid-barrel hydrocracking and gasoline hydrocracking. In gasoline hydrocracking, multiple fragmentation of the feed molecules is required. In mid-barrel hydrocracking, on the other hand, the average feedstock molecule should be split only once and very near the center of the molecule in order to maximize the mid-barrel fraction, and thereby minimize the production of light hydrocarbons, such as $C_1$–$C_4$ and gasoline.

Another beneficial aspect of this novel zeolite catalyst directly attributable to the method of its preparation is that a significant percentage of its total pore volume (exclusive of inter-crystalline voids) is composed of mesopores, i.e., pores having a diameter of at least 1 nm, preferably in the range of 2 to 60 nm. These large pores are believed to facilitate the conversion of the larger molecular constituents of the hydrocarbon feedstock which cannot enter into the pore system of an as-synthesized zeolite Y.

We have discovered that solid acidic zeolite catalysts constituents such as disclosed in our aforesaid copending application Ser. No. 417,611, when combined with hydrogenation catalyst constituents, are uniquely effective as catalysts in hydroprocessing reactions.

SUMMARY OF THE INVENTION

The catalyst compositions of the present invention comprise a metal hydrogenation component, preferably a noble metal of Group VIII and/or a base metal of Group VIB of the Periodic Chart of the Elements as set forth on pages 394 and 395 of Handbook of Chemistry and Physics, 38th Ed., the Chemical Rubber Publishing Co., U.S.A., in combination with a modified form of zeolite Y prepared by ammonium ion-exchanging zeolite Y to lower its alkali metal content to less than 4.0, preferably less than 3.0 weight percent, steaming the low-sodium product at a temperature of 550° C. to about 850° C. to reduce the unit cell dimension, preferably to the range of 24.34 to 24.58 Angstroms, and thereafter contacting the steamed product with a sufficient amount of an aqueous solution of ammonium ions having a pH of less than about 4.0, and for a sufficient time to exchange at least some of the residual alkali metal cations for ammonium ions and to increase the bulk $Si/Al_2$ molar ratio of the zeolite composition to the range of 6.5 to 20.

These catalysts are employed in the hydroconversion processes of the present invention, particularly in hydrocracking, hydotreating, reforming, hydrodealkylation and hydroisomerization using process conditions conventional in the art.

DETAILED DESCRIPTION OF THE INVENTION

In preparing the modified zeolite Y component of the present catalysts the starting material is a form of zeolite Y which has been ion-exchanged with ammonium ions, or ammonium ion precursors such as quarternary ammonium or other nitrogen-containing organic cations, to reduce the alkali metal content to less than about 4.0 weight percent (anhydrous basis) and preferably to less than about 3.0 weight percent. Optionally the starting zeolite Y can also contain or at some stage of the modification procedure be ion-exchanged to contain rare earth cations to the degree that the rare earth content as $RE_2O_3$ constitutes from 0.1 to 12.5 weight percent of the zeolite (anhydrous basis), preferably 8.5 to 12 weight percent. It will be understood by those skilled in the art that the ion-exchange capacity of the zeolite for introducing rare earth cations decreases during the course of the overall treatment process of the present invention. Accordingly, if rare earth cation exchange is carried out, for example, as the final step of the preparative process, it may not be possible to introduce even the preferred amount of rare earth cations. The framework Si/Al$_2$ ratio of the starting zeolite Y can be within the range of <3 to 6, but is advantageously greater than 4.8. The manner of carrying out this first ammonium ion exchange is not a critical factor and can be accomplished by means well known in the art. In general such conventional ammonium ion exchanges are carried out at pH values well above 4.0. We have found it advantageous to use a three-stage procedure with a 15 weight percent aqueous ammonium nitrate solution in proportions such that in each stage the initial weight ratio of ammonium salt to zeolite is about 1.0. Contact time between the zeolite and the exchange medium is about one hour for each stage and the temperature is about 85° C. The zeolite is washed between stages with about 7.5 liters of water per 0.45 kg. of zeolite. The exchanged zeolite is subsequently dried at 100° C. to a loss on ignition (LOI) at 1000° C. of 18.25 weight percent. If rare earth cations are to be introduced it is preferred to contact the already ammonium exchanged form of the zeolite with an aqueous solution of rare earth salts in the known manner. A mixed rare earth chloride salt can be added to an aqueous slurry of the ammonium exchanged zeolite Y (0.386 grams REC13 per gram of zeolite) at 85°–95° C. to yield a zeolite product having a rare earth content generally in the range of 8.5 to 12.0 weight percent rare earth as RE$_2$O$_3$.

The steaming of the ammonium, and optionally rare earth, exchanged zeolite Y is accomplished by contact with a steam environment containing at least about 2 psia steam, and preferably 100% steam at a temperature of from about 550° C. to 850° C., preferably 600° C. to 750° C., for a period of time to reduce the unit cell dimension to less than 24.60 Angstroms, preferably to the range of 24.34 to 24.58 Angstroms. We have found the use of 100% steam at a temperature of about 600° to 725° C. for about 1 hour to be an especially useful procedure.

The second, or low pH, ammonium ion exchange is a critical aspect of preparing the modified zeolite Y constituent of the present catalysts. This exchange can be carried out in the same manner as in the case of the initial ammonium exchange except that the pH of the exchange medium is lowered to below 4.0, preferably to below about 3, at least during some portion of the ion-exchange procedure. The lowering of the pH is readily accomplished by the addition of an appropriate mineral or organic acid to the ammonium ion solution. Nitric acid is found to be especially suitable for this purpose. Acids which form insoluble aluminum salts should be avoided to obtain the best results. In performing the low pH ammonium ion exchange, both the pH of the exchange medium, the quantity of exchange medium relative to the zeolite and the time of contact of the zeolite with the exchange medium are significant factors. It is found that so long as the exchange medium is at a pH below 4.0, sodium cations are exchanged for hydrogen cations in the zeolite and, in addition, at least some aluminum, both framework and non-framework, is extracted. The efficiency of the process is improved, however, by acidifying the ion exchange medium using more acid than is required to lower the pH to just below 4.0 As will be evident from the data set forth hereinafter, the more acidic the exchange medium is, the greater the tendency to extract framework as well as non-framework aluminum from the zeolite. The extraction procedure is carried out to a degree sufficient to produce a zeolite product having a bulk Si/Al$_2$ ratio of from about 6.5 to 20. The term bulk Si/Al$_2$ ratio as used herein refers to the ratio obtained by conventional chemical analysis which includes all forms of aluminum and silicon normally present. Framework Si/Al$_2$ ratios refer to the ratio of SiO$_2$ to AlO$_2$ tetrahedral units in the crystal lattice of the zeolite.

The metal hydrogenation catalyst constituent of the present compositions can exist within the final catalyst composite as a compound such as an oxide, sulfide, halide and the like, or in the elemental metallic state. As used herein, the term "metal hydrogenation catalyst" is inclusive of these various compound forms of the metals. The catalytically active metal can be contained within the inner adsorption region, i.e., pore system, of the zeolite constituent, on the outer surface of the zeolite crystals or attached to or carried by a binder, diluent or other constituent, if such is employed. The metal can be imparted to the overall composition by any method which will result in the attainment of a highly dispersed state. Among the suitable methods are (1) impregnation using an aqueous solution of a suitable metal compound followed by drying and thermal or chemical decomposition of the metal compound, (2) adsorption of a decomposable compound of the metal followed by thermal or chemical decomposition of the metal compound, (3) cation exchange using an aqueous solution of a suitable metal salt followed by chemical reduction of the cation, (4) cation exchange using an aqueous solution of a suitable metal compound in which the metal is in the cationic state with coordination complexing agents followed by thermal or chemical decomposition of the cationic complex, and (5) intensive mixing of suitable compounds of the metals such as oxides or salts, as by mulling, with constituents of the final catalyst composition not adversely affected by such mechanical abuse. Methods (3) and (4) are different in that method (3) concerns the use of metal salts, such as chlorides and nitrates of the iron group metals wherein the metal itself is the cation. Method (4) concerns the use of compounds of metals, such as platinum and palladium group metals, in which the metal is contained in the cationic portion of the compound in coordination complex form.

Methods (1), (2) and (3) are conveniently employed to introduce metals such as copper, silver, gold, iron, cobalt and nickel, while methods (1), (2) and (4) are suitable for introducing platinum and palladium group metals. Method (2) is particularly useful for introducing metals such as titanium, chromium, molybdenum, tungsten, rhenium, manganese, zinc and vanadium. Method (5) is particularly useful in combining salts of base metals with binder constituents of the catalysts such as amorphous alumina or silica. While essentially all of the metals possess some activity as hydrogenation promoters and many exhibit other activity in some aspect of hydrocarbon conversion, the preferred hydrogenation metal catalysts are the noble metals of Group VIII, e.g., platinum, palladium and rhodium, the non-noble metals of Group VIII, e.g., cobalt and nickel, and the base metals of Group VIB, e.g., tungsten and molybdenum. The quantity of hydrogenation metals incorporated into the overall catalyst composition is not critical but is usually in the range of 0.3 to about 1.0 weight percent for the noble metals of Group VIII, and in the range of 5 to 35 weight percent of the base metals, as oxides. It is commonly the case that mixtures of metals, particularly of base metals, are employed. The combination of nickel with tungsten appears to be particularly effective as a hydrogenation catalyst. Also the combination of nickel with molybdenum, while less effective than the Ni-W combination, is found to be more effective in conjunction with the particular zeolite constituent of the present invention than with prior-known zeolite Y-based compositions. Although we do not want to be bound by any particular theory, it is believed the decreased levels of octahedral aluminum remaining in the present compositions relative to the prior known zeolite Y-based compositions contribute, at least in part, to this improved property. In the common instance in which a Group VIII non-noble metal and a Group VIB metal component are used in combination, the finished catalyst contains between about 5 and 35%, preferably between about 10 and 30% by weight, calculated as the respective trioxides of the Group VIB metal components, and between about 2 and 15% by weight, preferably between 3 and 10% by weight, calculated as the respective monoxides of Group VIII metal components.

The finished catalyst compositions can contain the usual binder constituents in amounts which are in the range of about 10 to 95 percent by weight, preferably 15 to 50 weight percent. The binder is ordinarily an inorganic oxide or mixtures thereof. Both amorphous and crystalline can be employed. Examples of suitable binders are silica, alumina, silica-alumina, clays, zirconia, silica-zirconia and silica-boria. Alumina is a preferred binder material.

The process operating conditions using the catalysts of this invention are, in general, conventional in the art. In hydrocracking, such feedstocks as heavy petroleum residual stocks, cyclic stocks, gas oils and heavy gas oils can be hydrocracked at temperatures in the range of 400° F. to 825° F. using molar ratios of hydrogen to hydrocarbon in the range of 2 to 80, pressures between 10 and 3500 psig and a liquid hourly space velocity (LHSV) of from 0.1 to 20, preferably 1.0 to 10.

In reforming processes the hydrocarbon feedstocks contact the catalyst at temperatures of from about 700° F. to 1000° F., hydrogen pressures of from 100 to 500 psig, LHSV values in the range of 0.1 to 10 and hydrogen to hydrocarbon molar ratios in the range of 1 to 20, preferably between 4 and 12.

In isomerization processes a wide variety of feedstocks can be employed and, to a considerable extent, the nature of the feedstock determines the process conditions as is well known in the art. In general, saturated hydrocarbons, including acyclic paraffins and cyclic napthenes can be treated. The conversions of straight chain or mildly branched chain paraffins containing four or more carbon atoms per molecule into branched chain or more highly branched chains, respectively, are particularly advantageous when carried out with catalyst compositions of the present invention. The isomerization process also applies to the isomerization of alkylaromatic hydrocarbons including o-xylene, m-xylene, p-xylene, ethylbenzene, trimethylbenzenes and the like. Olefins can be converted to other olefinic species, such as 3-methyl-1-butene to 2-methyl-2-butene. The processes of this invention also include the hydroisomerization of olefins, wherein the olefins are hydrogenated to paraffins and the resulting paraffins isomerized to branched or more highly branched paraffins.

In hydroisomerization processes, in which feedstocks such as normal paraffins are converted to saturated branched chain isomers, the process is usually carried out at a temperature of from about 200° F. to 600° F., preferably 300° F. to 450° F., with an LHSV value of from about 0.1 to 10, and a pressure of 15 to 50 psig.

Hydrogen is supplied to the reactor in admixture with the hydrocarbon feedstock in molar proportions (H/Hc) of between 1 and 5. In the isomerization of alkylaromatics, process conditions in general are a temperature of about 200° C. to 600° C., a pressure of atmospheric to about 100 atmospheres, a LHSV of 0.1 to 20, and a H/Hc molar ratio of 0.5 to 1, up to about 20 to 1.

In hydrotreating (also referred to as hydrofining), the primary, but not the only, objective is to promote the selective hydrodecomposition of organic sulfur and/or nitrogen compounds in the feed, without substantially affecting hydrocarbon molecules therein. For this purpose it is preferred to employ the same general conditions described above for catalytic hydrocracking, and catalysts of the same general nature described in connection with dehydrocyclization operations. Feedstocks include gasoline fractions, kerosenes, jet fuel fractions, diesel fractions, light and heavy gas oils, deasphalted crude oil residua and the like, any of which may contain up to about 5 weight percent of sulfur and up to about 3 weight percent of nitrogen.

Similar conditions can be employed to effect hydrotreating, i.e., denitrogenation and/or desulfurization, of hydrocarbon feeds containing substantial proportions of organonitrogen and organosulfur compounds. As observed by D. A. Young in U.S. Pat. No. 3,783,123, it is generally recognized that the presence of substantial amounts of such constituents markedly inhibits the activity of catalysts for hydrocracking. Consequently, it is necessary to operate at more extreme conditions when it is desired to obtain the same degree of hydrocracking conversion per pass on a relatively nitrogenous feed than are required with a feed containing less organonitrogen compounds. Consequently, the conditions under which denitrogenation, desulfurization and/or hydrocracking can be most expeditiously accomplished in any given situation are necessarily determined in view of the characteristics of the feedstocks, in particular the concentration of organonitrogen compounds in the feedstock. As a result of the effect of organonitrogen compounds on the hydrocracking activity of these compositions it is not at all unlikely that the conditions most suitable for denitrogenation of a given feedstock having a relatively high organonitrogen content with minimal hydrocracking, e.g., less than 20 volume percent of fresh feed per pass, might be the same as those preferred for hydrocracking another feedstock having a lower concentration of hydrocracking inhibiting constituents, e.g., organonitrogen compounds. Consequently, it has become the practice in this art to establish the conditions under which a certain feed is to be contacted on the basis of preliminary screening tests with the specific catalyst and feedstocks.

In hydrodealkylation the usual feedstocks are alkyl-substituted aromatics, such as toluene, and the process is carried out at a temperature of about 400°–600° C., particularly 450°–550° C., at a pressure of 50–1000 psig, a weight hourly space velocity (WHSV) of 0.5 to 5 and using a hydrogen to hydrocarbon molar ratio (H/Hc) of 3–20, preferably 5–10.

While the invention has been generally described hereinabove, the invention will be better understood from the illustrations set forth in the following example:

EXAMPLE 1

An as-synthesized sodium zeolite Y having a unit cell dimension, a., of about 24.705Å was ion-exchanged using an aqueous ammonium nitrate solution to reduce the $Na_2O$ content to 2.8 weight percent. A portion of this composition was hydrothermally treated in a fixed bed by passing 100% steam at a temperature of 700° C. through the bed for a period of one hour. The steamed product retained about 89 percent of its crystallinity by comparison with standard NaY reference x-ray spectrum, a $SiO_2/Al_2O_3$ ratio of 5.15 and a $Na_2O$ content of 2.8, and a unit cell constant of 24.466. A sample comprising 1814.4 grams of the product was slurried in a 15 weight percent ammonium nitrate aqueous solution containing 1814.4 grams of $NH_4NO_3$. The slurry pH was lowered from 4.10 to 1.65 upon addition of 0.396 grams of 70% $HNO_3$ aqueous solution per gram of zeolite. The mixed slurry was heated to 85° C. and its temperature maintained for 60 minutes. The heated slurry was then filtered and the filter cake washed with distilled $H_2O$ to complete the first stage of ion exchange treatment.

The washed filter cake, after drying at 100° C. for 1.5 hours, was slurried again in a 15 weight percent ammonium nitrate solution (1814.4 grams $NH_4NO_3$). The slurry pH was lowered from 4.02 to 1.93 by addition of 0.141 grams of 70% $HNO_3$ aqueous solution per gram of zeolite. The slurry was heated to 85° C. and after 60 minutes, filtered and washed with distilled $H_2O$ on a Büchner funnel.

The same procedure was followed for the third stage of the ion exchange treatment except the amount of 70% $HNO_3$ was reduced to 0.56 grams per gram of zeolite. The addition of $HNO_3$ lowered slurry pH to 1.78.

The final zeolite composition had a unit cell dimension of 24.439Å, an x-ray crystallinity of 98 percent, a bulk $Si/Al_2$ ratio of 12.1, a surface area of 795 $M^2/g$. and contained 0.13 weight percent $Na_2O$.

EXAMPLE 2

A finished hydroconversion catalyst was prepared from the modified zeolite Y composition of Example 1 by mulling a mixture of 1075.53 grams (anhydrous) zeolite described in Example 1 with 268.88 grams of peptized pseudoboehmite and extruding 1/16" diameter pellets of this composition (80%/20%). The pseudoboehmite was contacted with 336.0 grams of a 12 weight percent $HNO_3$ solution and mixed until a homogenous paste was obtained. In order to prepare an extrudable mix in the muller, $H_2O$ was added to yield an LOI (1000° C.) of 47.5 weight percent. Upon drying at 100° C. overnight to lower LOI (1000° C.) to 12.97 weight percent, the pellets were calcined in a rotary kiln at a maximum temperature of 600° C., using 200 SCFH dry air and 60 minutes retention time. The calcined catalyst blanks had an LOI (1000° C.) of 1.43 weight percent and an apparent $H_2O$ pore volume capacity of 0.678 cc/gm. The calcined catalyst blanks (619.61 gms.) were subsequently metal loaded by being contacted in a tumbling glass jar with an aqueous solution containing 162.92 grams of nickel nitrate hexahydrate and 195.38 grams of ammonium metatungstate to yield, on a finished catalyst basis, 5 weight percent NiO and 21 weight percent $WO_3$. Following metal loading, the pellets were dried at 100° C. overnight and calcined in a rotary kiln at a maximum temperature of 500° C. With 200 SCFH air purge and 60 minute retention time.

EXAMPLE 3

A sample of a commercially produced steam stabilized form of zeolite Y was employed as the starting material to prepare a catalyst composition of the present invention. The starting zeolite had a unit cell dimension of 24.520Å, a $Si/Al_2$ molar ratio of 5.15 and a $Na_2O$ content of 2.8 weight percent. Using the general procedure of Example 5, the starting zeolite was subjected to a three-stage low pH ammonium ion exchange in which the nitric acid acidification and pH conditions are set forth below.

|  | Stage | | | |
|---|---|---|---|---|
|  | 1 | 2 | 3 | |
| $HNO_3$ Addition (gms. 70% $HNO_3$/gm. zeolite) | 0.396 | 0.141 | 0.056 | Σ = .593 |
| Initial Adjusted Slurry pH | 2.35 | 2.11 | 1.97 | |

The final zeolite product contained 0.13 weight percent $Na_2O$, had a unit cell constant, a., of 24.488Å, an x-ray crystallinity of 91%, and a bulk $Si/Al_2$ of 9.84.

EXAMPLE 4

The same procedure as described in Example 2 was repeated to form a finished catalyst composition except that the zeolite product of Example 3 was utilized instead of the zeolite of Example 1. The proportions of ingredients were also adjusted so that 400 grams of finished catalyst product were produced.

EXAMPLE 5

500 grams (anhydrous) of a commercially produced steam stabilized form of zeolite Y having a unit cell dimension of 24.520Å, a $Si/Al_2$ ratio of 5.15 and an $Na_2O$ content of 2.8 weight percent are slurried in a 15 weight percent aqueous ammonium nitrate solution containing 500 grams of $NH_4NO_3$. The slurry pH is lowered from 4.10 to 2.15 upon addition of 127 grams of 70% $HNO_3$ aqueous solution. The mixed slurry is heated to 85° C. and its temperature maintained for 60 minutes. The heated slurry is then filtered and the filter cake washed with 8345 ml of distilled $H_2O$. This completes the first stage of ion exchange treatment. The washed filter cake, after drying at 100° C. for 1.5 hours, is slurried again in a 15 weight percent ammonium nitrate solution (500 grams $NH_4NO_3$). The slurry pH is lowered from 4.02 to 2.33 by addition of 425 grams of 70% $HNO_3$ aqueous solution. The slurry is heated to 85° C., and after 60 minutes, filtered and washed with 8345 ml. of distilled $H_2O$. The same procedure is followed for the third stage of the ion exchange treatment except the amount of 70% $HNO_3$ is reduced to 17.5 grams. The addition of $HNO_3$ lowers the slurry pH from 3.39 to 2.48. The resulting product has a unit cell dimension of 24.554Å, a $SiO_2/Al_2O_3$ ratio of 8.08 and a residual soda content of 0.10 weight percent. The relative crystallinity of the starting material and the treated product are 91% and 110%, respectively, versus a sodium Y zeolite reference x-ray spectrum.

EXAMPLE 6

A catalyst was prepared by mulling a physical mixture of 44.45 grams ammonium metatungstate, 39.37 grams of nickel nitrate hexahydrate, 42.20 grams of peptized pseudoboehmite and 147.37 grams of zeolite catalyst base prepared as described in Example 5. Water was added during mulling to yield an extrudable rheology at 45.4 weight percent LOI (500° C.). The mull mixture was extruded as ⅛" diameter pellets and dried at 100° C. overnight (LOI [500° C.]=16.1 weight percent). The pellets were placed in a wire mesh tray and then calcined in a Blue-M box oven at 220° C. for 1.0 hour, followed by calcination at 500° C. for 1.0 hour, with 70 SCFH air purge. The finished catalyst contained 5.0 weight percent NiO and 19.6 weight percent $WO_3$.

In the following Examples 7 and 8 the zeolite Y used as the starting material was synthesized using aluminum sulfate (alum) as the source of alumina and sodium silicate (water glass) as the source of silica. Zeolite Y seeds or pseudocrystalline initiators were used in the crystallization stage to improve the yield of zeolite Y product. After reduction of the $Na_2O$ content to below 2.5 weight percent and steaming at 600° C. for one hour, the zeolite, identified hereinafter as SY-3, had a unit cell constant of 24.54Å and a surface area of 821 $M^2$/g.

EXAMPLE 7

Using 220.63 grams of SY-3, the three-stage low pH ammonium ion exchange procedure as generally described in the previous Examples was carried out using the following amounts of added nitric acid and pH values for the aqueous ammonium nitrate exchange medium:

| | Stage | | |
|---|---|---|---|
| | 1 | 2 | 3 |
| $HNO_3$ Addition (gms. 70% $HNO_3$/gm. SY-3) | .388 | .139 | .052 ($\Sigma$ = .579) |
| Initial adjusted Slurry pH | 2.37 | 2.12 | 2.06 |

The resulting product had a unit cell size of 24.530Å, a bulk $SiO_2/Al_2O_3$ ratio of 10.0, surface area of 955 m$^2$/g. and a sodium oxide content of <0.06 weight percent. This product had a relative crystallinity of 101%.

EXAMPLE 8

The procedures of Example 7 were repeated using 14 pounds of SY-3 and the following regime with respect to the final low pH ion exchange using aqueous ammonium nitrate solution acidified with nitric acid.

| | Stage | | |
|---|---|---|---|
| | 1 | 2 | 3 |
| $HNO_3$ Addition (gms. 70% $HNO_3$/gm. SY-3) | .254 | .085 | .035 ($\Sigma$ = .374) |
| Initial Adjusted Slurry pH | 2.60 | 2.40 | 2.57 |

The resulting product had a unit cell constant, a., of 24.580Å, a bulk $Si/Al_2$ molar ratio of 8.0, an x-ray crystallinity of 111 percent, a surface area of 902 $M^2$/g and an $Na_2O$ constant of 0.06 weight percent.

EXAMPLE 9

Using the procedures of Example 2, above, the zeolite product of Example 7 was formulated into a finished-catalyst containing nickel and tungsten hydrogenation promoters.

EXAMPLE 10

Using the procedures of Example 2, above, the zeolite product of Example 8 was formulated into a finished catalyst containing nickel and tungsten hydrogenation promoters.

EXAMPLE 11

Ammonium ion exchanged Y zeolite (2.8 weight percent $Na_2O$) was subjected to rare earth ion exchange with a mixed rare earth chloride (60% $La_2O_3$). Four pounds of $NH_4Y$ were slurried in an aqueous solution containing 1.544 lbs. $RECl_3$ (4.6 weight percent $RECl_3$ aqueous solution) and heated to 93° C. After 1.0 hour at 93° C., the exchange slurry was filtered and the filter cake washed with 32 gallons distilled $H_2O$. The resulting REY contained 11.5 weight percent $RE_2O_3$. REY was hydrothermally treated at 600° C. for 1.0 hour in the presence of 100% steam. This material was identified as RSY600. 200 grams (anhydrous) of RSY600 were then slurried in a 15 weight percent ammonium nitrate solution slurried in a 15 weight percent ammonium nitrate solution containing 200 grams $NH_4NO_3$ to yield a slurry pH of 3.82. The procedures generally described in the previous Examples respecting the final three-stage low pH ammonium ion exchange were followed using the following regime:

| | Stage | | |
|---|---|---|---|
| | 1 | 2 | 3 |
| $HNO_3$ Addition (gms. 70% $HNO_3$/gm. RSY600) | 0.099 | 0.028 | 0.014 $\Sigma$ = .141 |
| Initial Adjusted Slurry pH | 2.38 | 2.70 | 3.04 |

The resulting product had an $Na_2O$ content of 0.04 weight percent, an a. value of 24.646, an x-ray crystallinity of 46 percent, a bulk $Si/Al_2$ ratio of 5.80, a surface area of 770 $M^2$/2 g. and contained 10.5 weight percent $RE_2O_3$.

EXAMPLE 12

The procedures of Example 11 were repeated, treating 227 grams (anhydrous) of RSY600 in low pH ammonium nitrate solutions using the following amounts of $HNO_3$.

| | Stage | | |
|---|---|---|---|
| | 1 | 2 | 3 |
| $HNO_3$ Addition (gms. 70% $HNO_3$/gm. RSY600) | 0.396 | 0.141 | 0.056 $\Sigma$ = .593 |
| Initial Adjusted Slurry pH | 1.62 | 1.80 | 1.80 |

The resulting product contained 0.05 weight percent $Na_2O$ and 5.4 weight percent $RE_2O_3$, had a surface area of 826 $M^2$/g., a bulk $Si/Al_2$ molar ratio of 8.69, an a. value of 24.583Å and an x-ray crystallinity of 49.

EXAMPLE 13

A sample of rare earth exchanged zeolite Y which had previously been ammonium ion-exchanged to reduce its $Na_2O$ content to less than 2.5 was subjected to hydrothermal treatment at 700° C. for 1.0 hour in the presence 100% steam. The steamed material was labeled RSY700. 200 grams (anhydrous) of RSY700 were slurried in a 15 weight percent $NH_4NO_3$ solution containing 200 grams $NH_4NO_3$. The slurry pH was measured at 3.86.

The procedures of Example 11 were then followed for the low pH ammonium ion exchange using the following regime with respect to $HNO_3$ additions to the ion exchange medium:

|  | Stage | | |
|---|---|---|---|
|  | 1 | 2 | 3 |
| HNO$_3$ Addition (gms. 70% HNO$_3$/gm. RSY700) | 0.099 | 0.028 | 0.014 Σ = .141 |
| Initial Adjusted Slurry pH | 2.30 | 2.79 | 3.21 |

The resulting product had an Na$_2$O content of 0.09 weight percent and an RE$_2$O$_3$ content of 10.1 weight percent, a bulk SI/Al$_2$ ratio of 6.20, a surface area of 718 M$^2$/g., an x-ray crystallinity of 48 and a unit cell dimension, a., of 24.596Å.

EXAMPLE 14

Using 227 grams (anhydrous) of RSY700 prepared in Example 13, the procedures of Example 12 were repeated with respect to the final three-stage low pH ammonium ion exchange using the following regime:

|  | Stage | | |
|---|---|---|---|
|  | 1 | 2 | 3 |
| HNO$_3$ Addition (gms. 70% HNO$_3$/gm. RSY700) | 0.396 | 0.141 | 0.056 Σ = .593 |
| Initial Adjusted Slurry pH | 1.58 | 1.96 | 1.67 |

The resulting product had an Na$_2$O content of 0.13 weight percent and an RE$_2$O$_3$ content of 5.7 weight percent, a surface area of 785 M$^2$/g., a bulk Si/Al$_2$ ratio of 9.13, an x-ray crystallinity of 52 and a unit cell constant, a., of 24.537.

EXAMPLE 15

In this example, the zeolite described in Example 11 was loaded with 1.0 weight percent Pd using a Pd(NH$_3$)$_4$Cl$_2$ complex solution and used to prepare a finished catalyst. A palladium tetramine chloride complex was prepared by mixing 2.38 grams of PdCl$_2$, 8.26 grams of NH$_4$OH and 5.26 grams of distilled water and heating to 80° C. (1 hour). After 1.0 hour of mixing, the solution was cooled and diluted with 485.8 grams of distilled H$_2$O. A 16.7 weight percent solids aqueous slurry containing 141.96 grams (anhydrous) of the zeolite described in Example 11, and 7.1 grams NH$_4$OH was prepared. The palladium tetramine complex was added to the slurry over a 40 minute period. The slurry was filtered and washed with 2369.4 grams of distilled H$_2$O. The zeolite, containing 1.0 weight percent Pd., was dried at 100° C. overnight. 120 grams of the palladium exchanged zeolite were added to 30 grams of peptized pseudoboehmite and mulled. Water was added to yield an extrudable rheology (LOI [500° C.]=44.0 weight percent). Pellets extruded with ⅛" diameter were dried overnight at 100° C. in preparation for calcination. The dried pellets were placed in a wire mesh tray and calcined in a Blue-M box oven. The sample was heated to 220° C., held at 220° C. for 1.0 hour, heated to 480° C., held for 1.0 hour and bottled hot. The calcination was carried out in a 70 SCFH dry air purge. The finished catalyst was then hydrated to 5.0 weight percent LOI.

EXAMPLE 16

The procedures of Example 15 were repeated using the rare earth exchanged zeolite product of Example 12 to prepare a noble metal-containing catalyst.

EXAMPLE 17

The procedures of Example 15 were repeated using the rare earth exchanged zeolite product of Example 13 to prepare a noble metal-containing catalyst.

EXAMPLE 18

The procedures of Example 15 were repeated using the rare-earth-exchanged zeolite product of Example 14 to prepare a noble metal-containing catalyst.

EXAMPLE 19

In a reforming process in which a light naphtha feed having a 350° C. end point is reformed to increase its aromatic content, a catalyst composition of the present invention is employed in which the zeolite base has a lowered acidity by virtue of ion-exchange with barium and/or calcium cations. Such catalyst bases can also contain a greater content of alkali cations than is optimum for use in hydrocracking processes. The starting composition of the feed is about 95 percent (volume) paraffins, 10 percent olefins and 5 percent aromatics. The reforming reactor is carried out at a temperature of between 450° C. and 500° C. at a pressure of 450 psig. The hydrogen to hydrocarbon molar ratio is about 5. The contact time expressed as weight hourly space velocity is about 2. The aromatic content of the reformate is greater than 25 volume percent.

EXAMPLE 20

The hydrodealkylation of toluene using the rare earth exchanged and platinumloaded catalyst of Example 17 above is accomplished using a temperature of 550° C., a pressure of 450° C., a weight hourly space velocity (g./g./hr.) of 1.0 and a hydrogen to hydrocarbon ratio of 10. The product contains greater than about 20 mole percent benzene and a significant content of cracked molecular species.

EXAMPLE 21

Using a catalyst composition comprising an alumina carrier material containing about 5 weight percent of the zeolite base of Example 1, 0.55 weight percent platinum, 0.75 weight percent chloride, and 0.2 weight percent rhenium, a substantially pure meta-xylene feedstock commingled with about 8 moles of hydrogen per mole of hydrocarbon is isomerized to para-xylene by passage through a fixed bed reactor containing the catalyst. The reaction is carried out at about 400° C., at a pressure of about 300 psig and at an LHSV of about 4.0 hr$^{-1}$.

Hydrocracking Catalyst Evaluation

Catalysts prepared utilizing the procedures described above were evaluated for hydrocracking activity in separate runs wherein a gas oil feed plus added hydrogen is passed through a laboratory size reactor vessel containing 50 cc of catalyst under the following conditions: 1450 psia, 1.7 LHSV and a hydrogen-to-oil ratio of 8000 SCF/bl. The gas oil feed was a denitrogenated, unconverted fraction obtained from a previous integral hydrofining hydrocracking operation which had a boiling range of about 325°-768° C. with about 5% volume of the feed boiling below 400° F. Two different feeds were used. Feed A had an API gravity of 37.2 and Feed B an API gravity of 38.6.

To simulate first-stage hydrocracking in an H$_2$S/NH$_3$ containing atmosphere, thiophene and tertbutylamine were blended with the feedstock to provide respective sulfur and nitrogen concentrations of about 0.5 and about 0.2 weight percent. The operating temperature utilized in the reactor vessel was adjusted to maintain a total liquid product gravity of 47 API which corresponds to about 40 volume percent conversion of the feedstock to a $C_4$ to 420° F. gasoline product.

To simulate second-stage hydrocracking where an $H_2S$ atmosphere is required, thiophene was added to the feedstock to provide a sulfur concentration of about 0.5 weight percent. In this second-stage hydrocracking simulation, the operating temperature utilized in the reactor vessel was adjusted periodically to maintain a total liquid product gravity of 49.5 API corresponding to about a 60 volume percent conversion of the feedstock to a $C_4$ to 420° F. gasoline product.

The reported activity of the catalysts was compared against a commercial reference hydrocracking catalyst. The second stage performance of a given catalyst was evaluated by determining the temperature at which 49.5 API gravity was attained after 100 hours on-stream. First stage activity was defined by the temperature required to obtain 47 API gravity after 100 hours on-stream. The temperature difference between the catalyst under test and the reference catalyst is expressed as a delta value.

A positive value indicates a decreased activity, while a negative value indicates improved performance compared to the reference. Second and first stage hydrocracking activity test results are summarized in Tables 1 and 2.

TABLE 1

Finished Catalyst Performance
Gasoline Hydrocracking: First and Second Stage
Base Metal Zeolite Catalysts

| Catalyst (Example #) | Zeolite (Example #) | (Feed A) Catalytic Activity First Stage* | (Feed A) Catalytic Activity Second Stage* | (Feed B) Catalytic Activity First Stage* | (Feed B) Catalytic Activity Second Stage* |
|---|---|---|---|---|---|
| 2 | 1 | −12 | +10 | | |
| 4 | 3 | −3 | +1 | | |
| 6 | 5 | +5 | +13 | | |
| 9 | 7 | −16 | −24 | −10 | −14 |
| 10 | 8 | | | −13 | −15 |

*Activity is reported as difference from reference catalyst activity ($\Delta T = T_{test} - T_{ref}$). Reference catalyst, 60% LZY-82, 5% NiO and 15% $MoO_3$.

TABLE 2

Finished Catalyst Performance
Gasoline Hydrocracking: First and Second Stage
Noble Metal Zeolite Catalysts

| Catalyst (Example #) | Zeolite (Example #) | Catalytic Activity First Stage* | Catalytic Activity Second Stage* |
|---|---|---|---|
| 15 | 11 | −3 | −3 |
| 16 | 12 | +14 | +6 |
| 17 | 13 | −12 | −17 |
| 18 | 14 | +3 | +10 |
| Control RE-210-8 (6.5)** | | −11 | −20 |

*Activity is reported as difference from reference catalyst activity ($\Delta T = T_{TEST} - T_{REF}$). Reference catalyst contains 80% LZY-82 with 0.54 weight percent Pd.
**Palladium loaded (0.8 percent by weight on the finished catalyst). Steamed and ammonium exchanged rare earth exchanged LZ-210, having a Si/Al ratio of 6.5 prior to steaming and ammonium exchange.

What is claimed is:

1. Process for hydroconversion which comprises contacting a hydrocarbon feedstock in the presence of added a hydrogen under hydroconversion conditions with a catalyst composition which comprises a metal hydrogenation component and a modified form of zeolite Y prepared by
   (a) ammonium ion-exchanging zeolite Y to lower its sodium content to less than 3.0 weight percent;
   (b) hydrothermal steaming the low-sodium product of step (a) at a temperature of 550° to about 850° to reduce the unit cell dimension;
   (c) contacting the steamed product of step (b) with a sufficient amount of an aqueous solution of ammonium ions having a pH of less than about 4.0 for a sufficient time to exchange at least some of the residual sodium cations for ammonium ions and to increase the bulk $Si/Al_2$ molar ratio of the zeolite composition to the range of 6.5 to 20.

2. Process according to claim 1 wherein the hydroconversion process is hydrocracking.

3. Process according to claim 1 wherein the hydroconversion process is reforming.

4. Process according to claim 1 wherein the hydroconversion process is hydrodealkylation.

5. Process according to claim 1 wherein the hydroconversion process is isomerization.

6. Process according to claim 5 wherein the hydroconversion process is hydroisomerization.

7. Process according to claim 1 wherein the hydroconversion process is hydrofining.

8. Process according to claim 1 wherein the zeolite constituent of the catalyst composition contains rare earth cations by virtue of contacting the product of step (a) with rare earth cations under ion-exchange conditions.

* * * * *